United States Patent [19]

Spence et al.

[11] Patent Number: 5,266,342
[45] Date of Patent: Nov. 30, 1993

[54] METHOD FOR DECAFFEINATING COFFEE MATERIALS INCLUDING A REVERSE OSMOSIS PERMEATE RECYCLE

[75] Inventors: Jean E. Spence, Bogota, N.J.; Saul N. Katz, Monsey, N.Y.; Gerald J. Vogel, Carrollton, Tex.; Ravi Prasad, Midlothian, Va.

[73] Assignee: Kraft General Foods, Inc., Northfield, Ill.

[21] Appl. No.: 532,160

[22] Filed: Jun. 1, 1990

Related U.S. Application Data

[63] Continuation of Ser. No. 229,373, Aug. 5, 1988, abandoned.

[51] Int. Cl.⁵ ............................................. A23F 5/22
[52] U.S. Cl. .................................. 426/422; 426/424; 426/427
[58] Field of Search ...................... 426/422, 427, 424

[56] References Cited

U.S. PATENT DOCUMENTS

| | | |
|---|---|---|
| 3,806,619 | 4/1974 | Zosel . |
| 4,246,291 | 1/1981 | Prasad et al. . |
| 4,260,639 | 4/1981 | Zosel . |
| 4,341,804 | 7/1982 | Prasad . |
| 4,348,422 | 9/1982 | Zosel . |
| 4,409,253 | 10/1983 | Morrison et al. ............ 426/427 X |
| 4,411,923 | 10/1983 | Hubert et al. . |

*Primary Examiner*—Joseph Golian
*Attorney, Agent, or Firm*—Thomas A. Marcoux; Daniel J. Donovan; Thomas R. Savoie

[57] ABSTRACT

An improved method for extracting caffeine from a coffee material, preferably raw coffee solids, with an extractant comprising supercritical carbon dioxide. Caffeine is continuously absorbed from the extractant with an aqueous wash solution in an absorber. This wash solution is continuously treated by reverse osmosis to form a caffeine-containing retentate stream and a permeate stream containing dissolved solids but substantially no caffeine. The permeate stream is recycled and used as wash water in the absorber or is used to prehydrate solid coffee materials, or both. The permeate stream comprises acidic dissolved solids.

10 Claims, 1 Drawing Sheet

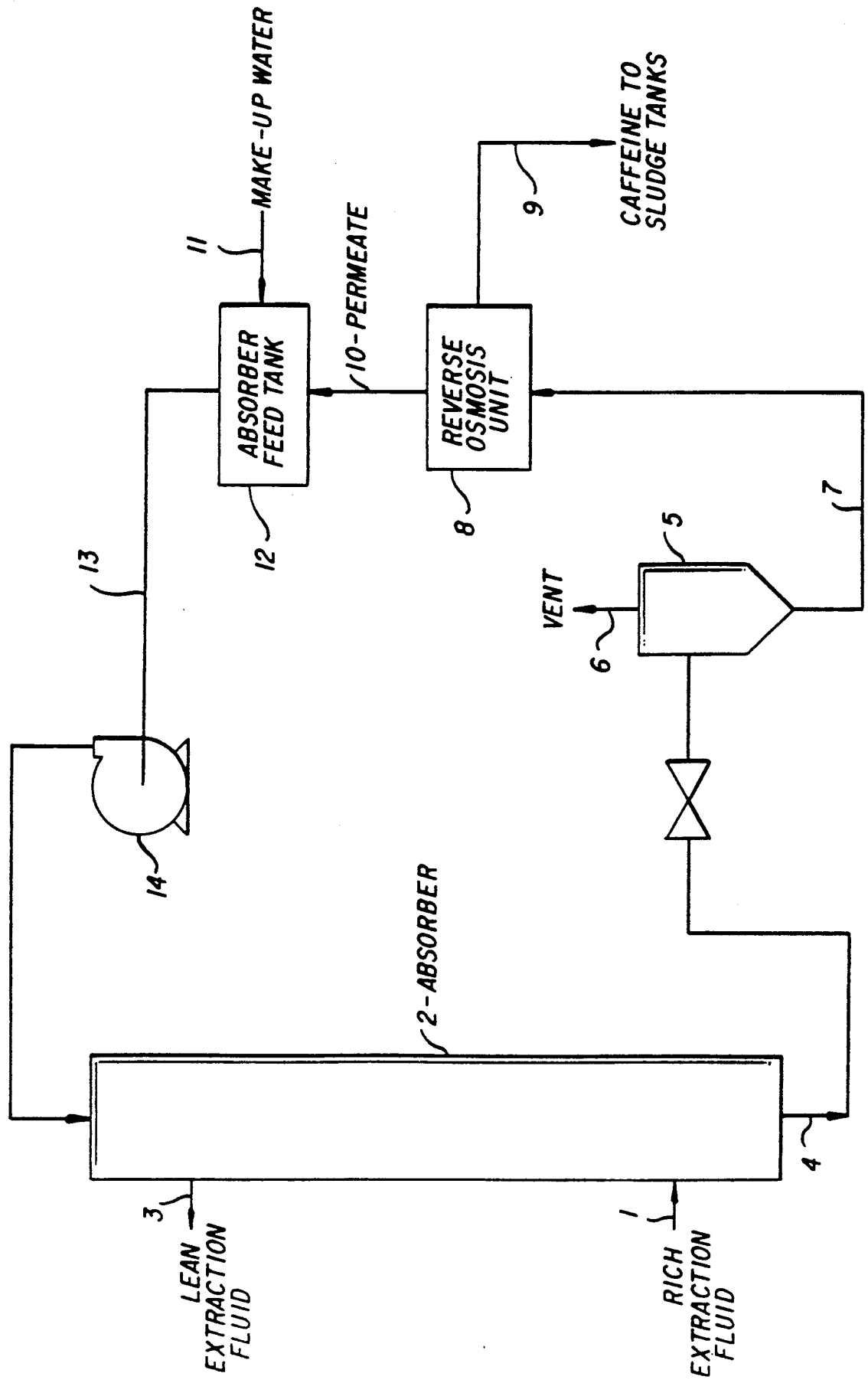

METHOD FOR DECAFFEINATING COFFEE MATERIALS INCLUDING A REVERSE OSMOSIS PERMEATE RECYCLE

This application is a continuation of application Ser. No. 229,373, filed Aug. 5, 1988, now abandoned.

BACKGROUND OF THE INVENTION

Various coffee decaffeination methods are known in the art. Coffee beans are first hydrated with water and then caffeine is extracted with liquid organic solvent such as benzene, ethyl acetate, isopropanol, chloroform, dichloroeythylene or trichloroethylene.

Various other methods are known which do not require the use of liquid organic solvents. In one such method supercritical carbon dioxide is used to extract caffeine from hydrated coffee. The coffee material so extracted may be in the form of premoistened raw coffee solids, either whole beans or particulate, or less preferably in the form of a liquid extract. Typically, caffeine is removed from the carbon dioxide so that the carbon dioxide can be recycled to the extraction process. U.S. Pat. No. 4,260,639 to Zosel discloses a carbon dioxide extraction process in which active carbon is used to remove the caffeine from the carbon dioxide. U.S. Pat. No. 4,411,923 to Hubert, et al. discloses a carbon dioxide extraction process in which ion exchange materials are used to remove caffeine from the carbon dioxide.

Supercritical carbon dioxide extraction process which use water to absorb caffeine from carbon dioxide are also known in the art. Some of these processed include removing caffeine from caffeine loaded water and reusing this water in the absorption process. U.S. Pat. No. 3,806,619 to Zosel discloses a process in which caffeine is separated from a wash water by air or nitrogen stripping. Water is stripped from caffeine loaded wash water and is then condensed and reused for caffeine absorption. U.S. Pat. No. 4,348,422 to Zosel discloses a process in which caffeine is separated from a wash water by distillation and the distilled water is then reused for caffeine absorption. Each of U.S. Pat. Nos. 4,341,804 and 4,246,291 to Prasad, et al. disclose a process in which evaporation, reverse osmosis or crystallization is used to separate caffeine from a wash water. A membrane permeate can be reused for caffeine absorption.

SUMMARY OF THE INVENTION

The present invention relates to an improved method for extracting caffeine from a coffee-containing material with supercritical carbon dioxide. More particularly, the invention involves extracting caffeine from a coffee material with supercritical carbon dioxide and then continuously absorbing caffeine from the carbon dioxide extractant by contact with an aqueous wash solution in an absorber. Wash solution from the absorber and containing caffeine is continuously treated by reverse osmosis to form a permeate stream containing acidic dissolved non-caffeine solids and substantially no caffeine. In a first embodiment, at least a portion of the permeate solution is recycled to the absorber and used as at least a portion of the wash solution. In a second embodiment in which the coffee material comprises raw coffee solids, at least a portion of the permeate solution is used to hydrate the coffee material prior to its decaffeination with a carbon dioxide extractant. Such use of a permeate solution containing acidic dissolved non-caffeine solids increases the decaffeination rate of the coffee material, and the use of the permeate solution for hydration of the raw coffee solids also increases the hydration rate. Where the coffee material comprises raw coffee solids, portions of the permeate solution containing acidic dissolved non-caffeine solids can be used both as recycle to the absorber and to hydrate the coffee material.

BRIEF DESCRIPTION OF THE DRAWING

The drawing is a diagrammatic flow sheet of the process of the instant invention, including an absorber and a caffeine recovery system.

DESCRIPTION OF THE INVENTION

Supercritical carbon dioxide is effective to remove caffeine from coffee material and is particularly effective for decaffeination of raw coffee solids, either whole beans or particulate. While roasted coffee solids or liquid extract of roasted coffee may also be decaffeinated with supercritical carbon dioxide, the process is accompanied by rather large losses of desirable constituents. Accordingly, the present invention has particular applicability to decaffeination of raw coffee solids, either in whole bean or particulate form. The process is particularly well suited to the decaffeination of green coffee beans.

If the coffee material is in the form of raw coffee solids, it is necessary that it is hydrated to a moisture content between 20-50% preferably about 30-45% prior to decaffeination. This is accomplished by means well known in the art such as steaming or soaking. For example, green coffee beans may be steamed in at about 100° C. for approximately two hours. In the second embodiment of the instant invention, an aqueous reverse osmosis permeate solution which is described below is used to moisten the raw coffee solids. The use of the permeate solution rather than city water increases the rate of hydration of the coffee material about 5-15% and increases the rate of decaffeination about 10-20%.

The coffee material is decaffeinated by contact with an extraction fluid in an extractor. The extractor can be of any type known in the art capable of operating at the temperatures and pressures of the instant invention. The extraction fluid comprises supercritical carbon dioxide maintained at a temperature above its critical temperature of 30° C. and at a pressure above its critical pressure of 72.8 atmospheres. The extraction fluid will usually contain water vapor due to caffeine removal using water. The extraction fluid may also contain so-called enhancers which are added to the fluid to improve its capability to extract caffeine. Typical enhancers include methanol, ethanol, and ethyl acetate and are added to the extraction fluid at proportions between about 0.1% and 20%. Since the extraction fluid is recycled to the extractor after processing with water for removal of caffeine, it will contain a small amount of caffeine and will also contain other substances extracted from the coffee material. As described below, caffeine is continuously removed from the extractant by contact with an aqueous wash solution. The extraction fluid will, therefore, also contain any substances picked up from this wash solution including water.

The temperature used in the extractor will generally be as high as possible which increases the extraction rate but not so high as to cause damage to the coffee material. In general, in the case of raw coffee solids, the temperature should not exceed about 135° C. Preferably, raw coffee solids are extracted at a temperature of from 85-135%, more preferably 95-125% C. Aribica's or other quality coffee is extracted preferably at 95° to 105° C. and Robusta or other poorer flavored coffee at 115° to 135° C.

Pressure in the extractor will also generally be high to favor extraction but not so high as to require excessively high pressure equipment or operating costs. Generally, pressures of about 100 to 500 atmospheres are suitable, preferably about 150 to 350 atmospheres and most preferably 225-300 atmospheres for Arabic and 275 to 325 atmospheres for Robusta coffee.

The coffee material may be decaffeinated either batchwise or continuously with respect to the movement of coffee material into and out of the extractor. Continuous processes include methods by which solid coffee materials, which occupy a volume corresponding to a fraction of the total extractor volume, are periodically and continuously charged and discharged from an extractor. These processes can be called pulse processes. A suitable process of this type is disclosed in application Ser. No. 07/166,74, filed Mar. 8, 1988, now U.S. Pat. No. 4,820,537, issued Apr. 11, 1989, the disclosure of which is incorporated by reference herein. In either case, a continuous stream of extraction fluid is first passed through the extractor, then washed with water in an absorber to remove caffeine, and then recycled to the extractor. The decaffeinated coffee material may then be processed further by means known in the art such as drying and/or roasting.

Referring to the drawing, caffeine-rich extraction fluid is fed from the extractor (not shown) into absorber 2 through inlet line 1. Caffeine-lean extraction fluid exits the absorber through outlet line 3 and is returned to the extractor. The absorber may be of any configuration known in the art to effect gas/liquid contact, such as a packed or open column. A suitable open column is disclosed in application Ser. No. 07/229,369, filed on even date, entitled "Caffeine Recovery from Supercritical Carbon Dioxide", the disclosure of which is incorporated by reference herein. The absorber preferably operates at close to the same temperature and pressure as the extractor. In the absorber, the extraction fluid is washed with an aqueous wash solution. Caffeine-rich wash solution is removed from the absorber through outlet line 4 and is flashed to a reduced pressure, preferably about atmospheric pressure, which enables dissolved gases to be separated from the solution in vessel 5 and be recovered through vent 6. Caffeine-rich wash water containing between about 0.05% and 1% caffeine by weight is then fed through line 7 to reverse osmosis unit 8 where it is separated into a retentate stream 9 and a permeate stream 10. The retentate stream 9 contains a higher content of caffeine than the wash water, for example between about 1% and 15%. Caffeine can be recovered from this stream which is removed through outlet line 9 by any means known in the art such as drying and then refining to produce a marketable product. The permeate stream contains substantially no caffeine, preferably not more than about 0.10% by weight. It is a novel aspect of the instant invention that the permeate stream also comprises dissolved acidic substances which, when recycled back to the absorber 2 through line 10, produce the unexpected advantages of increasing the decaffeination rate of the coffee material by about 10-20% and improving the flavor of the decaffeinated product. The exact composition of these non-caffeine dissolved substances or the mechanism by which they achieve the unexpected advantages described above is not known. At least a portion of the dissolved substances are acidic in nature. It is also known that the non-caffeine dissolved substances comprise organic acids. The pH of the permeate recycle stream is preferably less than 6, more preferably from about 3 to 5. The process can be monitored by measuring the pH or the amount of dissolved substances in the permeate stream. The process can be controlled based on these measurements by adjusting the flow rate through the membrane per unit membrane surface area (the flux) or the membrane type can be changed. By these means, the pH can be maintained at close to a constant value. Where city water is used, the "natural" pH of the permeate recycle stream should first be determined using deionized water to ensure that a desired degree of acidity is achieved solely because of the dissolved acidic coffee substances.

The reverse osmosis unit 8 can be of any configuration known in the art comprising modules arranged in series, in parallel or in combinations thereof. It may be operated with or without recycle of the retentate but is preferably operated with such recycle. Any reverse osmosis membrane which will affect the separation described above can be used. One such suitable membrane is ZF 99 manufactured by Paterson Candy, Incorporated. The average flux of solution through this particular membrane is typically about 30 gallons per square foot per day. At least a portion of permeate stream is mixed with a make-up water stream from an inlet line 11 to form a caffeine-lean wash solution stream by any suitable means such as feeding both the permeate stream and the water stream into absorber feed tank 12. The make-up water stream may be either city water or deionized water. While the pH can also be adjusted to maintain a desired value by the addition of a food grade acid or base, it is essential that the permeate stream is acidic solely as a result of the non-caffeine substances dissolved therein arrising from the use of the water to remove caffeine from the supercritical carbon dioxide. It is preferred that this "natural" pH is less than 6 and more preferably less than 5. Preferably, 60-100% of the permeate stream is mixed with the make-up water stream. The remainder may be used for backwashing the reverse osmosis membranes or to hydrate fresh green beans, or both. The flow rate of the make-up water is selected such that the process will run at a steady state. The flow rate of make-up water stream 11 may be between about 1% and 25% of the flow rate of the wash solution stream. In a first embodiment, the wash solution stream is pumped through line 13 by high pressure pump 14 back to the absorber 2. In a second embodiment (not shown) at least a portion of the permeate recycle stream may be used to hydrate raw coffee solids prior to feeding the raw coffee solids to the extractor as described above. Where raw coffee solids are being processed, a first portion of the permeate recycle stream may be directed to the absorber column and a second portion may be used to hydrate the coffee solids prior to extraction.

The instant invention is illustrated in the following examples. In Example 1, coffee material is decaffeinated by a process like that of the instant invention with the exception that the wash water fed to the absorber consists of fresh city water rather than an acidic reverse osmosis permeate as is used in the instant process. In Example 2, coffee material is decaffeinated by the process of the instant invention.

EXAMPLE 1

A volume of green Colombian coffee beans is moisturized to 43.9% by contact with steam at 100° C. for about 2 hours in an agitated mixer. The moisturized coffee beans are added to a 4 inch ID×30 foot high extraction vessel by a volume of about 0.2 cubic feet being added to a blow case every 36 minutes, pressurizing the blow case to 248.8 bar, then dropping these beans into the extraction vessel. Simultaneously, beans which have 96.9% of the caffeine removed are dropped from the bottom of the extraction vessel into a pressurized blow case. These decaffeinated beans are dried to a target moisture content of 10.5% in a fluid bed drier for about 20 minutes at 180° F. outlet air temperature.

Caffeine-lean supercritical carbon dioxide at 248.8 bar at 100° C. is recirculated countercurrently into the bottom of the extraction vessel at a flow rate of 964 pounds per hour and exits the top of the extractor at a caffeine concentration of 115 parts per million. This caffeine-rich supercritical carbon dioxide is countercurrently contacted with fresh city water at 248.8 bar at 100° C. in a 4 inch ID×40 foot high absorber. The water removes 99% of the caffeine from the carbon dioxide which is then recirculated back to the extractor. This is equivalent to a removal rate of 0.110 pounds of caffeine per hour.

Caffeine-rich water which is removed from the absorption vessel is flashed to atmospheric pressure to remove dissolved gases and is sent to a caffeine concentration/refining system.

The dried decaffeinated beans are then roasted to a 50 RC.

EXAMPLE 2

Green Colombian coffee beans are moisturized to 40.2% by contact with steam at 100° C. for about 2 hours in an agitated mixer. The moisturized coffee beans are added to a 4 inch ID×30 foot high extraction vessel by a volume of 0.2 cubic feet being added to a blow case every 36 minutes, pressurizing the blow case to 247.7 bar then dropping these into the extraction vessel. Simultaneously, beans which have 97.3% of the caffeine removed are dropped from the bottom of the extraction vessel into a pressurized blow case. These decaffeinated beans are then dried to a target moisture content of 10.5% moisture in a fluid bed drier for approximately 20 minutes at 180° F. outlet air temperature.

Caffeine-lean supercritical carbon dioxide at 247.7 bar at 100° C. is recirculated countercurrently into the bottom of the extraction vessel at a flow rate of 971 pounds per hour and exits the top of the extractor at a caffeine concentration of 136 parts per million. This caffeine-rich supercritical carbon dioxide is contacted with acidic reverse osmosis permeate solution at 247.7 bar at 100° C. in a 4 inch ID×40 foot high absorber. The solution removes 98.3% of the caffeine from the carbon dioxide which is recirculated back to the extractor. This is equivalent to a removal rate of 0.130 pounds of caffeine per hour.

Caffeine-rich solution is first removed from the absorption vessel, then flashed to atmospheric pressure to remove dissolved gases and is then sent to a caffeine concentration system. This caffeine concentration system comprises a reverse osmosis unit which concentrates the caffeine in the solution from about 0.148 to about 3.8%. The reverse osmosis membrane is ZF99 manufactured by Paterson Candy, Incorporated. The reverse osmosis permeate solution has virtually no caffeine (typically about 0.002%), but contains dissolved solids, including organic acids which bring the pH to less than 5. A small amount of deionized make-up water is then added to the permeate solution and the combined stream is fed back to the absorber. The reverse osmosis retentate solution is sent on for recovery of caffeine.

The dried decaffeinated beans are roasted to 50 RC and organoleptically compared to caffeinated beans and beans decaffeinated by the process of Example 1. The beans produced by the process of Example 2 (the instant process) are judged by an expert panel to taste closer to the caffeinated control than those produced by the process of Example 1.

A comparison of Example 1 and Example 2 illustrates the advantages of the present invention. Not only does the present process produce a better tasting decaffeinated product, it also increases the rate of decaffeination. The caffeine removal rate from the extractant (and hence from the coffee beans) of 0.130 pounds per hour as shown in Example 2 represents an increased rate of about 18% when compared with the 0.110 pounds per hour rate shown by Example 1. Also, the product of Example 2 shows an increased level of decaffeination of 97.3% as compared with the 96.9% level shown in Example 1.

Examples 3 and 4 which follow compare processes which use city water and permeate solution, respectively, to remove caffeine from a fluid extractant comprising supercritical carbon dioxide. Examples 3 and 4 differ from Examples 1 and 2 in that the pressure in the extractor is substantially higher.

EXAMPLE 3

Green Colombian coffee beans are moisturized to 41.1% by contact with steam at 100° C. for about 2 hours in an agitated mixer. The moisturized coffee beans are added to a 4 in ID×30 foot high extraction vessel by adding a volume of 0.2 cubic feet every 36 minutes to a blowcase, pressurizing the blowcase to system pressure and dropping these beans into the extraction vessel while removing an equal volume of decaffeinated coffee from the bottom into a pressurized blow case. The size of the blowcase is such as to give a 6 hour residence time of the coffee in the extractor.

Caffeine lean supercritical carbon dioxide with 7.1 ppm caffeine at 296.7 bar and 101.2° C. is recirculated countercurrently into the bottom of the extraction vessel at a flow rate of 1959 lb/hr and exits the top of the extractor at a caffeine concentration of 69.3 ppm. This caffeine rich supercritical carbon dioxide is countercurrently contacted with tap water at the same pressure and temperature in a 4 in ID×40 foot high absorber. The water removes 89.8% of the caffeine from the $CO_2$ which is recirculated back to the extractor. Beans decaffeinated with this process have 95.06% of the caffeine removed in 6 hr which corresponds to a 0.501 $hr^{-1}$ decaffeination rate (assuming first order rate kinetics).

EXAMPLE 4

Another batch of Colombian green coffee beans (from the same lot as those above) is moisturized to 41.6% in the same agitated mixer as above. They too are added to the extraction vessel every 36 min. to effect a 6 hr residence time in the extractor.

Caffeine-lean supercritical carbon dioxide with 6.7 ppm caffeine at 297.5 bar and 99.9° C. is recirculated through the extractor at a flow rate of 1960 lb/hr and exits the top of the extractor at a caffeine concentration of 78.4 ppm. The caffeine rich supercritical carbon dioxide is countercurrently contacted with an acidic reverse osmosis permeate solution at the same pressure and temperature as in the extractor. The permeate solution removes 91.4% of the caffeine from the carbon dioxide which is recirculated back to the extractor. The permeate solution is obtained by a method which is described below.

The caffeine-rich water which leaves the absorber is flashed to atmospheric pressure and is then sent to a reverse osmosis unit which concentrates the caffeine from 0.12% to 4.5% The reverse osmosis membrane used is ZF99. The water which permeates through the membrane has 0.002% caffeine and a pH of 3.6. A small amount of tap water (about 4.5 lb) is added to bring the water flow rate to 163 lb/hr. This acidic solution is recycled back as feed to the water absorber.

Beans decaffeinated in this manner have 97.1% of the caffeine removed in 6 hrs which corresponds to a 0.588 $hr^{-1}$ decaffeination rate (assuming first order rate kinetics).

Example 4 exhibits a first order decaffeination rate constant of 0.588 $hr^{-1}$ which is 17% greater than the 0.501 $hr^{-1}$ value exhibited by Example 3.

Examples 5 and 6 which follow compare processes in which filtered tap water and permeate solution, respectively, are used to hydrate coffee beans prior to caffeine extraction. In both examples, carbon is used to remove caffeine from the supercritical carbon dioxide extractant. The permeate solution used to hydrate the beans in Example 6 is derived from the process of Example 4.

EXAMPLE 5

Four and one half pounds of green Robusta beans are moisturized to 34.0% using filtered tap water with a pH of 6.5. The moisturized beans are added to a 3½ inch ID×36 inch high vessel and 1.5 lb Calgon CPG carbon are added to an equally sized vessel.

The system is pressurized to 297.8 bar (4318 psig) and 245° F. (118.3° C.). Carbon dioxide at a flow rate of 300 lb/hr is recirculated with a pump through a heat exchanger to maintain temperature from the extraction vessel to the carbon adsorption vessel for 3 hrs. The system is vented to atmospheric pressure, the beans are removed from the extractor and measured to be 86.2% decaffeinated. Assuming first order rate kinetics, the decaffeination rate is 0.66 $hr^{-1}$.

EXAMPLE 6

Four and one half pounds of Robusta green beans from the same batch as Example 5 are moisturized to 35.3% with reverse osmosis solution produced by the process of Example 4. This solution has a pH of 3.6. These beans are loaded into the same extraction vessel as Example 5 and 1.5 lb Calgon CPG carbon is added to the absorber.

The system is pressurized to 296.4 bar (4298 psig) at a temperature of 249° F. (120.6° C.). A flow rate of 305 lb/hr carbon dioxide is recirculated through the system for 3 hours. This results in 88.7% decaffeination of the beans which calculates to a 0.73 $hr^{-1}$ decaffeination rate.

A comparison of Example 5 and Example 6 illustrates an advantage of the second embodiment of the instant invention. The second embodiment (permeate solution used for hydration) as shown in Example 6 exhibits a first order decaffeination rate constant of 0.73 $hr^{-1}$ which is 10% greater than the 0.66 $hr^{-1}$ value exhibited by Example 5.

What is claimed is:

1. A process for increasing the decaffeination rate of moistened raw coffee solids comprising:
   contacting moistened raw coffee solids with a fluid extractant comprising supercritical carbon dioxide to form an extractant stream rich in caffeine;
   contacting said extractant stream rich in caffeine with wash water to remove a substantial portion of the caffeine therefrom to form a caffeine-containing wash water stream and a caffeine-depleted extractant stream;
   recycling the caffeine depleted extractant stream to the moistened raw caffeine solids to form said extractant stream rich in caffeine;
   subjecting said caffeine-containing wash water stream to reverse osmosis to form a retentate stream and a permeate stream, said retentate stream being more concentrated in caffeine than said caffeine-containing wash water stream, and said permeate stream containing substantially no caffeine and containing dissolved acidic non-caffeine coffee solids such that the pH of said permeate stream, due solely to the presence of said acidic solids, is less than 6;and
   utilizing at least a portion of said permeate stream to form at least a portion of said wash water stream effective to increase the extraction rate of caffeine from the moistened raw coffee solids.

2. A process as in claim 1 wherein said the permeate stream has a pH of less than 5.

3. A process as in claim 1 wherein said dissolved acidic solids comprise organic acids.

4. A process as in claim 2 wherein the permeate stream comprises not more than about 0.010% caffeine by weight.

5. A process as in claim 1 comprising monitoring the pH of the permeate stream and maintaining it at an acidic value.

6. A process as in claim 1, comprising utilizing at least a portion of the permeate stream to moisten said raw coffee solids prior to extracting caffeine therefrom.

7. A process according to claim 1 wherein said raw coffee solids are moistened to a moisture content of 20–50%.

8. A process according to claim 7 wherein said moistened, raw coffee solids are contacted with a continuous stream of said fluid extractant in an extractor vessel through which raw coffee solids are periodically moved.

9. A process according to claim 1 wherein said permeate stream has a pH of from 3 to 5.

10. A process according to claim 1 further comprising adjusting the flow rate of reverse osmosis or changing the reverse osmosis membrane to maintain the pH of said permeate stream at said acidic value.

* * * * *